(12) United States Patent
Yamamoto et al.

(10) Patent No.: US 11,592,059 B2
(45) Date of Patent: Feb. 28, 2023

(54) THRUST MAGNETIC BEARING DEVICE

(71) Applicant: KAWASAKI JUKOGYO KABUSHIKI KAISHA, Kobe (JP)

(72) Inventors: Ryoma Yamamoto, Kakogawa (JP); Yoshihiko Ozaki, Kobe (JP); Kentaro Sakata, Kobe (JP); Masanori Kuroda, Nishinomiya (JP); Masashi Sawada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 192 days.

(21) Appl. No.: 16/958,886

(22) PCT Filed: Dec. 14, 2018

(86) PCT No.: PCT/JP2018/046085
§ 371 (c)(1),
(2) Date: Jun. 29, 2020

(87) PCT Pub. No.: WO2019/131213
PCT Pub. Date: Jul. 4, 2019

(65) Prior Publication Data
US 2020/0340525 A1 Oct. 29, 2020

(30) Foreign Application Priority Data
Dec. 28, 2017 (JP) .............................. JP2017-254573

(51) Int. Cl.
*F16C 32/04* (2006.01)
(52) U.S. Cl.
CPC ........ *F16C 32/047* (2013.01); *F16C 32/0459* (2013.01)

(58) Field of Classification Search
CPC ................ F16C 32/047; F16C 32/0459; F16C 32/0463; F16C 32/0476; F16C 32/048; F16C 32/0461; F16C 32/044
See application file for complete search history.

(56) References Cited

FOREIGN PATENT DOCUMENTS

| JP | S63-122208 U | | 8/1988 |
|---|---|---|---|
| JP | 2010-71304 A | | 4/2010 |
| JP | 2016118225 A | * | 6/2016 |
| JP | 2016118226 A | * | 6/2016 |

OTHER PUBLICATIONS

JP2016118225AEnglishtranslation (Year: 2022).*
JP2010071304AEnglishtranslation (Year: 2022).*
JP2016118226A English translation (Year: 2022).*

* cited by examiner

*Primary Examiner* — Tulsidas C Patel
*Assistant Examiner* — Viswanathan Subramanian
(74) *Attorney, Agent, or Firm* — Oliff PLC

(57) ABSTRACT

A thrust magnetic bearing device includes: a thrust disc fixed to a rotating body; and a pair of electromagnets provided so as to sandwich the thrust disc and be spaced apart from the thrust disc in a direction along a rotation axis. Each of the pair of electromagnets includes: a coil wound around the rotation axis of the rotating body; and a ring-shaped core accommodating the coil. The core includes a slit which is located at at least one circumferential position of the core and extends from an outside outer peripheral surface as a starting point toward a center of the core. The slit is formed in a range including at least an inside outer peripheral surface.

6 Claims, 7 Drawing Sheets

THRUST MAGNETIC BEARING DEVICE

TECHNICAL FIELD

The present invention relates to a thrust magnetic bearing device.

BACKGROUND ART

A thrust magnetic bearing device is a bearing device configured such that a pair of electromagnets attract a thrust disc, provided at a rotating body, to receive force in a direction along a rotation axis in a noncontact manner, the pair of electromagnets being provided at both sides of the thrust disc in the direction along the rotation axis. The thrust magnetic bearing device performs such a control operation that when the position of the thrust disc in the direction along the rotation axis changes due to, for example, a change in force received from the rotating body, currents supplied to coils of the electromagnets are adjusted in accordance with such change in position, and with this, the position of the thrust disc in the direction along the rotation axis is returned to a reference position.

However, when the position of the thrust disc in the direction along the rotation axis changes, eddy currents flowing around the rotation axis are generated at iron cores covering the coils. When the eddy currents are generated at the cores, electromagnetic force decreases, and therefore, responsiveness of position control of returning the thrust disc to the reference position deteriorates. To solve this problem, there is a method of forming grooves inside the cores. According to this method, the generation of the eddy currents can be suppressed, and as a result, the deterioration of the responsiveness of the position control can be suppressed (see PTL 1 below).

CITATION LIST

Patent Literature

PTL 1: Japanese Laid-Open Patent Application Publication No. 2010-71304

SUMMARY OF INVENTION

Technical Problem

However, even when the groove is formed inside the core, part of the eddy current flows through a radially outer side of the groove, i.e., bypasses the groove, and therefore, the deterioration of the responsiveness of the position control cannot be suppressed in some cases. Further, forming the groove inside the core is not easy from the viewpoint of machining.

The present invention was made under these circumstances, and an object of the present invention is to provide a thrust magnetic bearing device which is capable of adequately suppressing the deterioration of the responsiveness of the position control and is easy in machining.

Solution to Problem

A thrust magnetic bearing device according to one aspect of the present invention includes: a thrust disc fixed to a rotating body; and a pair of electromagnets provided so as to sandwich the thrust disc and be spaced apart from the thrust disc in a direction along a rotation axis. Each of the pair of electromagnets includes a coil wound around the rotation axis of the rotating body and a ring-shaped core accommodating the coil. The core includes an outside outer peripheral surface that is a radially outer surface, an outside inner peripheral surface that is a radially inner surface, an outside opposing surface opposed to the thrust disc, an outside non-opposing surface located at an opposite side of the outside opposing surface in the direction along the rotation axis, an inside outer peripheral surface opposed to a radially outer surface of the coil, an inside inner peripheral surface opposed to a radially inner surface of the coil, an inside opposing surface opposed to a surface of the coil, the surface of the coil being located close to the thrust disc, and an inside non-opposing surface located at an opposite side of the inside opposing surface across the coil. The core includes a slit which is located at at least one circumferential position of the core and extends from the outside outer peripheral surface as a starting point toward a center of the core. The slit is formed in a range including at least the inside outer peripheral surface.

According to the above configuration, the core of the electromagnet includes the slit which extends from the outside outer peripheral surface as the starting point in a direction toward the center of the core. To be specific, the outside outer peripheral surface of the core is discontinuous at a portion corresponding to the slit. Therefore, the eddy current cannot flow through a radially outer side of the slit and cannot practically bypass the slit. As a result, the generation of the eddy current can be adequately suppressed, and the deterioration of the responsiveness of the position control can be adequately suppressed. Further, the eddy current tends to be generated at a radially outer portion of the core, not a radially inner portion of the core. Therefore, by forming the slit in at least a range from the outside outer peripheral surface to the inside outer peripheral surface, the generation of the eddy current can be effectively suppressed. Further, the slit extending from the outside outer peripheral surface as the starting point toward the center of the core can be formed from an outside of the core, and therefore, the machining is easy.

In the above thrust magnetic bearing, the slit may be formed in a range including the inside non-opposing surface.

Since the inside non-opposing surface of the core is located close to the coil, the eddy current tends to be generated around the inside non-opposing surface of the core. Therefore, when the slit is formed in the range including the inside non-opposing surface of the core as described above, the generation of the eddy current can be effectively suppressed.

In the above thrust magnetic bearing, the core may include a ring-shaped aperture extending from the inside opposing surface toward the outside opposing surface, an aperture inner peripheral surface defining a radially inner side of the aperture, and an aperture outer peripheral surface defining a radially outer side of the aperture, and the slit may be formed in a range excluding the aperture inner peripheral surface.

When forming the slit at the core, balance between attractive force of attracting the thrust disc and the effect of suppressing the eddy current (the improvement of the responsiveness) is important. The aperture inner peripheral surface is a portion around which the eddy current is hardly generated but which is located close to the thrust disc and therefore significantly influences the attractive force of attracting the thrust disc. On this account, by forming the slit in the range excluding the aperture inner peripheral surface as described above, the decrease in attractive force can be suppressed without significantly deteriorating the responsiveness of the position control. Further, since the slit is not formed on the aperture inner peripheral surface, the strength of the core can be secured.

In the above thrust magnetic bearing, the slit may be formed in a range excluding a portion of the outside opposing surface which portion corresponds to the thrust disc and a portion of the inside opposing surface which portion corresponds to the thrust disc.

The portion of the outside opposing surface which portion corresponds to the thrust disc and the portion of the inside opposing surface which portion corresponds to the thrust disc significantly influence the attractive force of attracting the thrust disc. Especially, an area (magnetic pole area) of a surface of the core which surface is opposed to the thrust disc is closely related to the attractive force of attracting the thrust disc. Whether to form the slit at the portion of the outside opposing surface which portion corresponds to the thrust disc is directly related to the size of the magnetic area. Therefore, by forming the slit in the region excluding the portion of the outside opposing surface which portion corresponds to the thrust disc and the portion of the inside opposing surface which portion corresponds to the thrust disc as described above, the decrease in attractive force of attracting the thrust disc can be suppressed.

In the above thrust magnetic bearing, the slit may be formed in a range including the inside inner peripheral surface.

The inside inner peripheral surface is located close to the coil, and therefore, the eddy current tends to be generated around the inside inner peripheral surface. Therefore, by forming the slit in the range including the inside inner peripheral surface as described above, the generation of the eddy current can be more effectively suppressed, and the deterioration of the responsiveness of the position control can be adequately suppressed.

In the above thrust magnetic bearing, the slit may be formed only at the one circumferential position of the core.

By forming just one slit at a route through which the eddy current flows, the generation of the eddy current can be adequately suppressed. On the other hand, when a large number of slits are formed, the volume of the core decreases, and the electromagnetic force weakens. The attractive force of attracting the thrust disc decreases, and the strength of the core decreases. Therefore, by forming the slit at only one circumferential position of the core as described above, the generation of the eddy current can be adequately suppressed, and the decrease in attractive force of attracting the thrust disc and the decrease in strength can be suppressed.

Advantageous Effects of Invention

According to the above configuration, the present invention can provide a thrust magnetic bearing device which is capable of adequately suppressing the deterioration of the responsiveness of the position control and is easy in machining.

DESCRIPTION OF EMBODIMENTS

Embodiment 1

Figure 1:
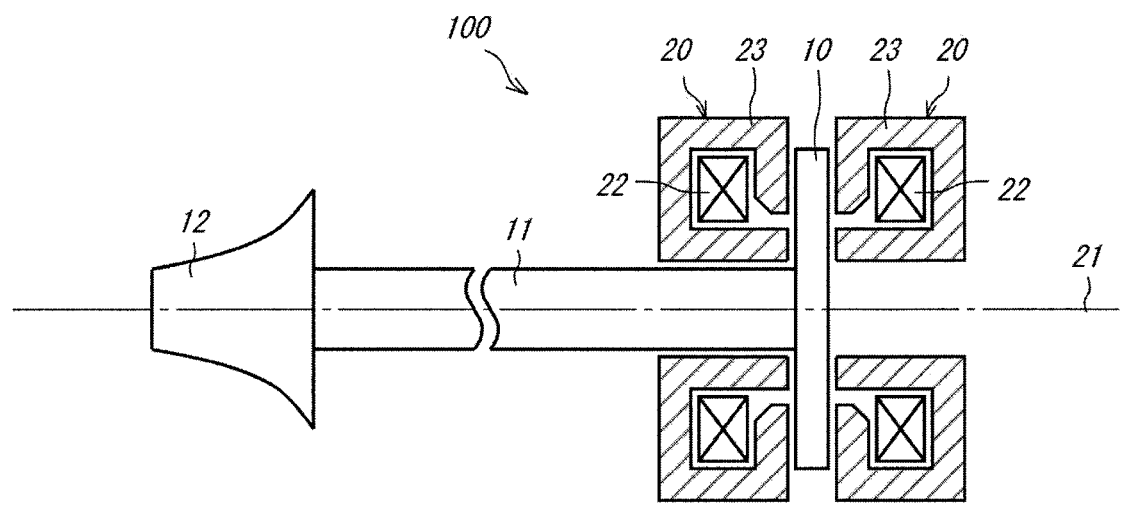
FIG. 1 is a schematic partial sectional view of a thrust magnetic bearing device according to Embodiment 1.

Schematic Structure of Thrust Magnetic Bearing Device
First, a schematic configuration of a thrust magnetic bearing device 100 according to Embodiment 1 will be described. FIG. 1 is a schematic partial sectional view of the thrust magnetic bearing device 100 according to Embodiment 1. As shown in FIG. 1, the thrust magnetic bearing device 100 includes a thrust disc 10 and a pair of electromagnets 20.

The thrust disc 10 of the present embodiment is fixed to a rotation axis direction end portion of a rotating body 11. The thrust disc 10 is a magnetic body made of, for example, iron. The rotating body 11 of the present embodiment is a rotor of a turbo blower. An impeller 12 is provided at a rotation axis direction end portion of the rotating body 11 which portion is opposite to the thrust disc 10. The rotating body 11 receives force from the impeller 12, the force acting in a direction toward the thrust disc 10 (in a right direction on the paper surface of FIG. 1). When the force applied to the rotating body 11 changes, a position of the thrust disc 10 in a direction along a rotation axis changes.

The pair of electromagnets 20 are provided at both sides of the thrust disc 10 in the direction along the rotation axis so as to sandwich the thrust disc 10 and be spaced apart from the thrust disc 10. The electromagnets 20 are the same in configuration as each other and are arranged symmetrically about the thrust disc 10. Each of the electromagnets 20 includes a coil 22 and a ring-shaped core 23 (also see FIG. 2). The coil 22 is wound around a rotation axis 21 of the rotating body 11. The core 23 accommodates the coil 22 therein. The core 23 is a magnetic body made of, for example, iron, and electromagnetic force is generated by supplying a current to the coil 22.

Both of the electromagnets 20 generate the electromagnetic force and attract the thrust disc 10 by the electromagnetic force. With this, the electromagnets 20 can make the thrust disc 10 float between the electromagnets 20 and receive force in the direction along the rotation axis in a noncontact manner. As described above, the force in the direction toward the thrust disc 10 is applied to the rotating body 11 from the impeller 12. Therefore, in the present embodiment, a current of the electromagnet 20 located close to the impeller 12 is made larger than a current of the electromagnet 20 located far from the impeller 12, and with this, attractive force of the electromagnet 20 located close to the impeller 12 is made larger than attractive force of the electromagnet 20 located far from the impeller 12. Thus, the thrust disc 10 is made to be located at a predetermined reference position.

Further, when the position of the thrust disc 10 in the direction along the rotation axis changes, the currents supplied to the coils 22 of the electromagnets 20 are adjusted. With this, control (position control) of returning the position of the thrust disc 10 in the direction along the rotation axis to the reference position is performed. It should be noted that when the position of the thrust disc 10 in the direction along the rotation axis changes, eddy currents are generated at the cores 23 of the electromagnets 20. When the eddy currents are generated at the cores 23, the electromagnetic force decreases. With this, a time it takes for the position of the thrust disc 10 in the direction along the rotation axis to return to the reference position increases, i.e., responsiveness of position control deteriorates.

Figure 2:
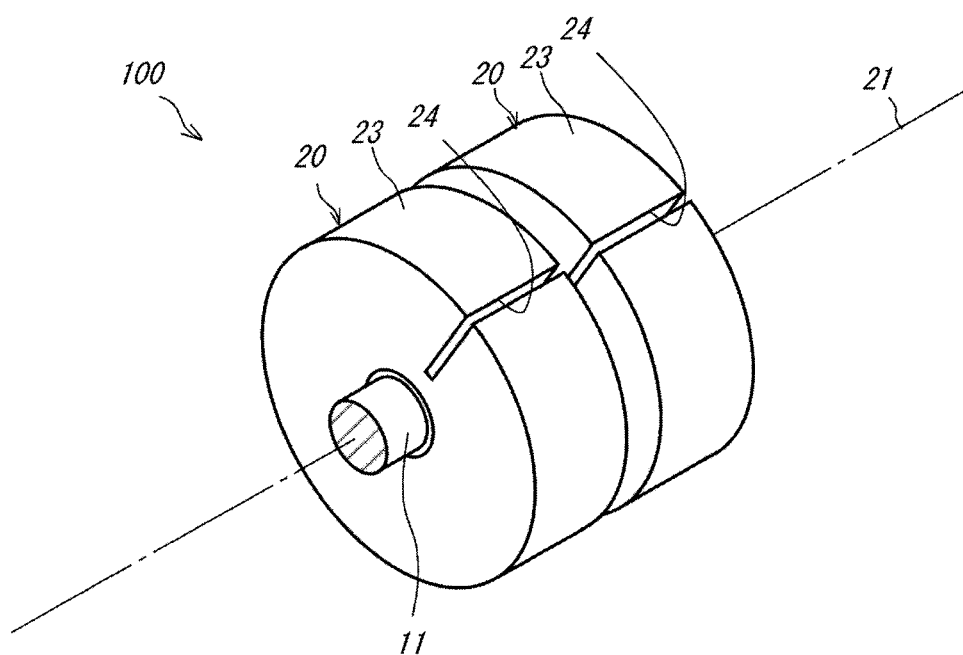
FIG. 2 is a perspective view of the thrust magnetic bearing device shown in FIG. 1.

FIG. 2 is a perspective view of the thrust magnetic bearing device 100. As shown in FIG. 2, a slit 24 is formed at a predetermined circumferential position of each core 23. In the present embodiment, the circumferential positions of the slits 24 of the electromagnets 20 are the same as each other. However, the circumferential positions of the slits 24 of the electromagnets 20 may be different from each other.

Detailed Structure of Core

Figure 3:
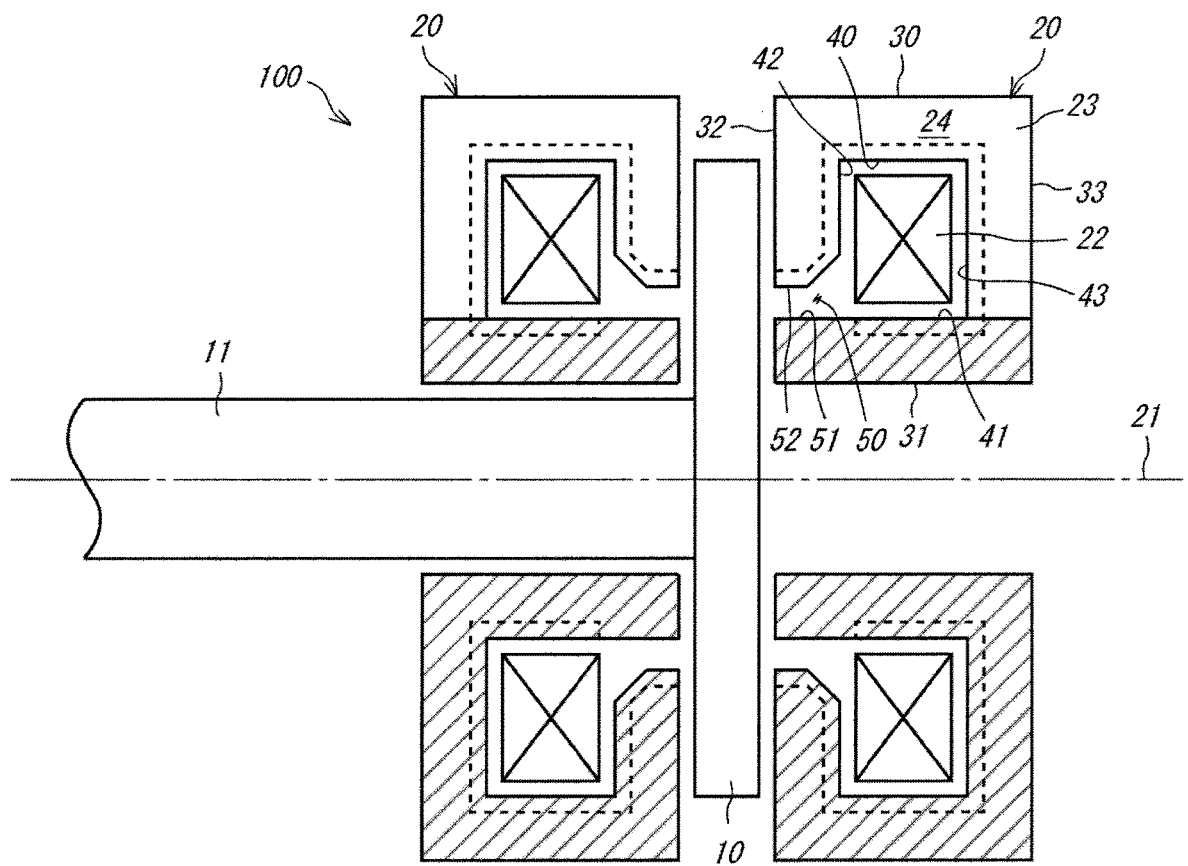
FIG. 3 is an enlarged sectional view of the thrust magnetic bearing device shown in
FIG. 1.

Next, a detailed structure of the core 23 will be described. FIG. 3 is an enlarged sectional view showing the slits 24, etc. of the thrust magnetic bearing device 100. It should be noted that regions surrounded by broken lines in FIG. 3 are regions where the eddy currents tend to be generated. Further, in the cores 23, portions where diagonal lines are not shown are portions where the slits 24 are formed. The same is true in FIGS. 4 to 8.

As shown in FIG. 3, each core 23 includes: an outside outer peripheral surface 30 that is a radially outer surface; an outside inner peripheral surface 31 that is a radially inner surface; an outside opposing surface 32 opposed to the thrust disc 10; and an outside non-opposing surface 33 located at an opposite side of the outside opposing surface 32 in the direction along the rotation axis. These surfaces 30, 31, 32, and 33 form an outer surface of the core 23.

The core 23 includes: an inside outer peripheral surface 40 that is opposed to (or may contact) a radially outer surface of the coil 22; an inside inner peripheral surface 41 that is opposed to (or may contact) a radially inner surface of the coil 22; an inside opposing surface 42 that is opposed to (or may contact) a surface of the coil 22 which surface is located close to the thrust disc 10; and an inside non-opposing surface 43 that is located at an opposite side of the inside opposing surface 42 across the coil 22. These surfaces 40, 41, 42, and 43 form an inner surface of the core 23.

The core 23 further includes: a ring-shaped aperture 50 extending from the inside opposing surface 42 toward the outside opposing surface 32; an aperture inner peripheral surface 51 defining a radially inner side of the aperture 50; and an aperture outer peripheral surface 52 defining a radially outer side of the aperture 50. It should be noted that in the present embodiment, the aperture outer peripheral surface 52 includes not only a surface that is continuous with the outside opposing surface 32 and parallel to the rotation axis 21 but also a surface that extends therefrom toward the inside opposing surface 42 and is inclined relative to the rotation axis 21.

As a result of experiments and investigations, the present inventors have found that when the slits 24 are not formed, the eddy currents tend to be generated at the regions surrounded by the broken lines in FIG. 3, i.e., the eddy currents tend to be generated around the inside outer peripheral surface 40, the inside inner peripheral surface 41, the inside opposing surface 42, the inside non-opposing surface 43, and the aperture outer peripheral surface 52 of the core 23 which surfaces are located close to the coil 22.

Range of Slit

Next, a range where the slit 24 is formed will be described. First, the slit 24 extends from the outside outer peripheral surface 30 as a starting point in a direction toward a center (rotation axis 21) of the core 23. When viewed from the rotation axis 21, the slit 24 extends from a predetermined radial position as a starting point toward a radially outer side of the core 23, reaches the outside outer peripheral surface 30, and is open outward in a radial direction. It should be noted that in the present embodiment, a depth (radial size) of the slit 24 is constant regardless of positions in the direction along the axis. However, as in Embodiment 2 described below, the depth of the slit 24 may change depending on the positions in the direction along the axis.

As described above, the slit 24 of the present embodiment extends from the outside outer peripheral surface 30 in a direction toward the outside inner peripheral surface 31. To be specific, the outside outer peripheral surface 30 is discontinuous at a radially outer side of the slit 24. Therefore, the eddy current does not flow through the radially outer side of the slit 24 and cannot practically bypass the slit 24. The eddy current tends to be generated at a radially outer portion of the core 23, not a radially inner portion of the core 23. Therefore, by forming the slit 24 in at least a range from the outside outer peripheral surface 30 to the inside outer peripheral surface 40, the generation of the eddy current can be effectively suppressed. Therefore, in the present embodiment, the generation of the eddy current can be adequately suppressed, and the deterioration of the responsiveness of the position control can be adequately suppressed. Further, since the slit 24 extends from the outside outer peripheral surface 30 as the starting point in the direction toward the center of the core 23, the slit 24 can be formed from an outside of the core 23, and therefore, the machining is easy.

The slit 24 is formed in a range which includes the outside outer peripheral surface 30, a portion of the outside opposing surface 32 which portion is located at a radially outer side of the inside inner peripheral surface 41; a portion of the outside non-opposing surface 33 which portion is located at a radially outer side of the inside inner peripheral surface 41, the inside outer peripheral surface 40, the inside opposing surface 42, the inside non-opposing surface 43, and the aperture outer peripheral surface 52 and which does not include the outside inner peripheral surface 31, a portion of the outside opposing surface 32 which portion is located at a radially inner side of the inside inner peripheral surface 41, a portion of the outside non-opposing surface 33 which portion is located at a radially inner side of the inside inner peripheral surface 41, the inside inner peripheral surface 41, and the aperture inner peripheral surface 51.

In the present embodiment, the slit 24 is formed in a range including the inside outer peripheral surface 40, the inside opposing surface 42, and the inside non-opposing surface 43 around which the eddy current tends to be generated. Therefore, the generation of the eddy current can be effectively suppressed. As a result, the deterioration of the responsiveness of the position control can be effectively suppressed.

Further, when forming the slit 24 at the core 23, balance between the attractive force of attracting the thrust disc 10 and the effect of suppressing the eddy current (the improvement of the responsiveness) is important. In the present embodiment, the slit 24 is not formed at the aperture inner peripheral surface 51 and the portion of the outside opposing surface 32 which portion is located at the radially inner side of the inside inner peripheral surface 41, the aperture inner peripheral surface 51 and the portion of the outside opposing surface 32 being regions around which the eddy current is hardly generated but which are located close to the thrust disc 10 and influences the attractive force of attracting the thrust disc 10. Therefore, the decrease in attractive force can be suppressed without significantly deteriorating the responsiveness of the position control, and the strength of the core 23 can also be secured.

Next, the other embodiments will be described. Embodiment 1 and the other embodiments are different from each other regarding the range where the slit 24 is formed. Except for this, Embodiment 1 and the other embodiments basically have the same configuration. Therefore, differences from Embodiment 1 regarding the range where the slit 24 is formed in each embodiment will be mainly described below.

Embodiment 2

Figure 4:
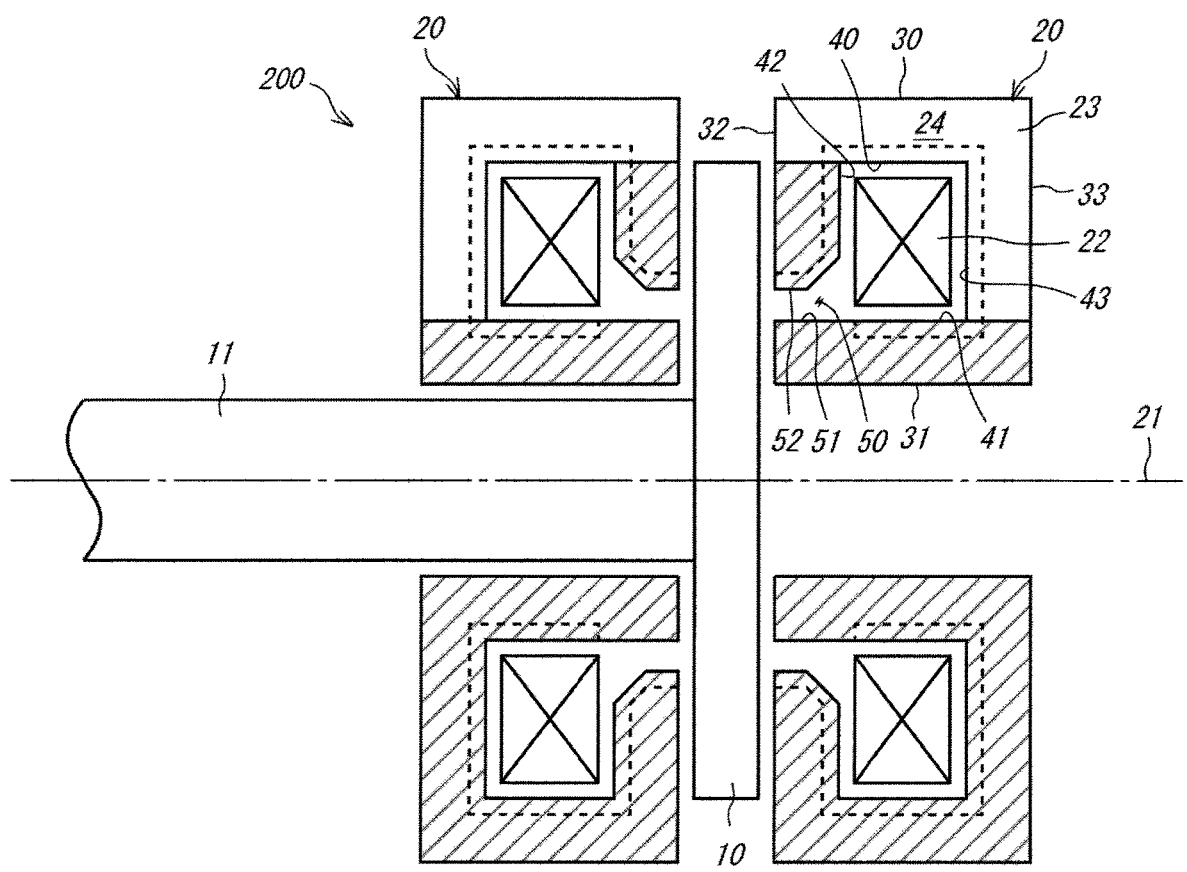
FIG. 4 is an enlarged sectional view of the thrust magnetic bearing device according to Embodiment 2.

FIG. 4 is an enlarged sectional view showing the slits 24, etc. of a thrust magnetic bearing device 200 according to Embodiment 2. Embodiment 2 is different from Embodiment 1 in that the slit 24 is not formed in a range including a portion of the outside opposing surface 32 which portion is located at a radial outer side of the inside inner peripheral surface 41 and corresponds to the thrust disc 10, a portion of the inside opposing surface 42 which portion corresponds to the thrust disc 10, and the aperture outer peripheral surface 52.

In the present embodiment, the slit 24 is not formed at the inside opposing surface 42 and the aperture outer peripheral surface 52 where the eddy current tends to be generated. Therefore, the eddy current tends to be generated slightly more than Embodiment 1. However, since the slit 24 is not formed at a portion corresponding to the thrust disc 10, the decrease in attractive force of attracting the thrust disc 10 can be suppressed. Especially, an area (magnetic pole area) of a surface of the core 23 which surface is opposed to the thrust disc 10 is closely related to the attractive force of attracting the thrust disc 10. In the present embodiment, since the slit 24 is not formed at the portion of the outside opposing surface 32 which portion corresponds to the thrust disc 10, the decrease in attractive force of attracting the thrust disc 10 can be suppressed. Further, the strength of the core 23 becomes higher than that of Embodiment 1.

Embodiment 3

Figure 5:
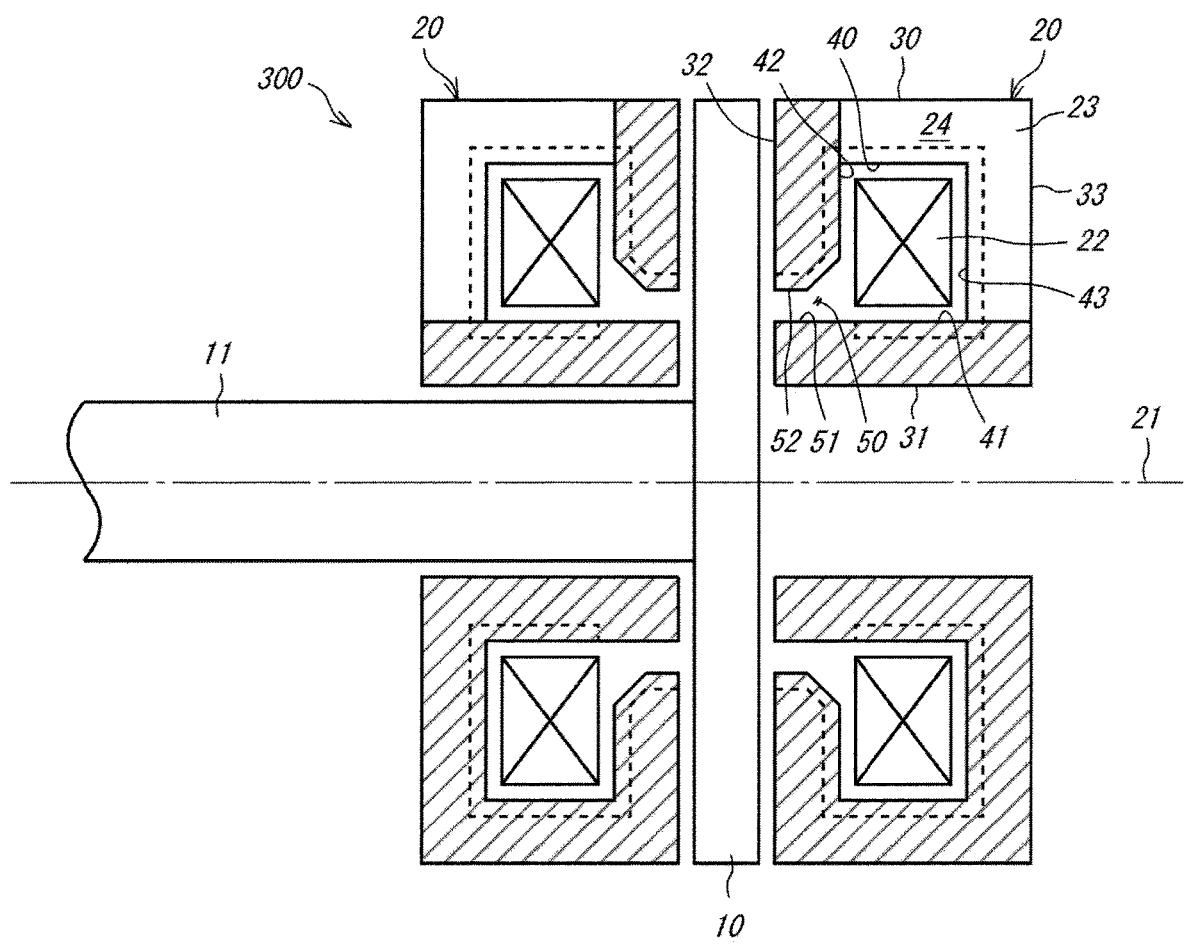
FIG. 5 is an enlarged sectional view of the thrust magnetic bearing device according to Embodiment 3.

FIG. 5 is an enlarged sectional view showing the slits 24, etc. of a thrust magnetic bearing device 300 according to Embodiment 3. Embodiment 3 is different from Embodiment 1 in that as with Embodiment 2, the slit 24 is not formed in a range including a portion of the outside opposing surface 32 which portion is located at a radial outer side of the inside inner peripheral surface 41 and corresponds to the thrust disc 10, a portion of the inside opposing surface 42 which portion corresponds to the thrust disc 10, and the aperture outer peripheral surface 52.

However, the thrust disc 10 of the present embodiment is larger in outer diameter than the thrust disc 10 of Embodiment 2. Therefore, the above-described range where the thrust disc 10 is not formed is wider outward in the radial direction than that of Embodiment 2. As with the above, in the present embodiment, the eddy current tends to be generated slightly more than Embodiment 1. However, the decrease in attractive force of attracting the thrust disc 10 can be suppressed, and the strength of the core 23 can be increased.

Embodiment 4

Figure 6:
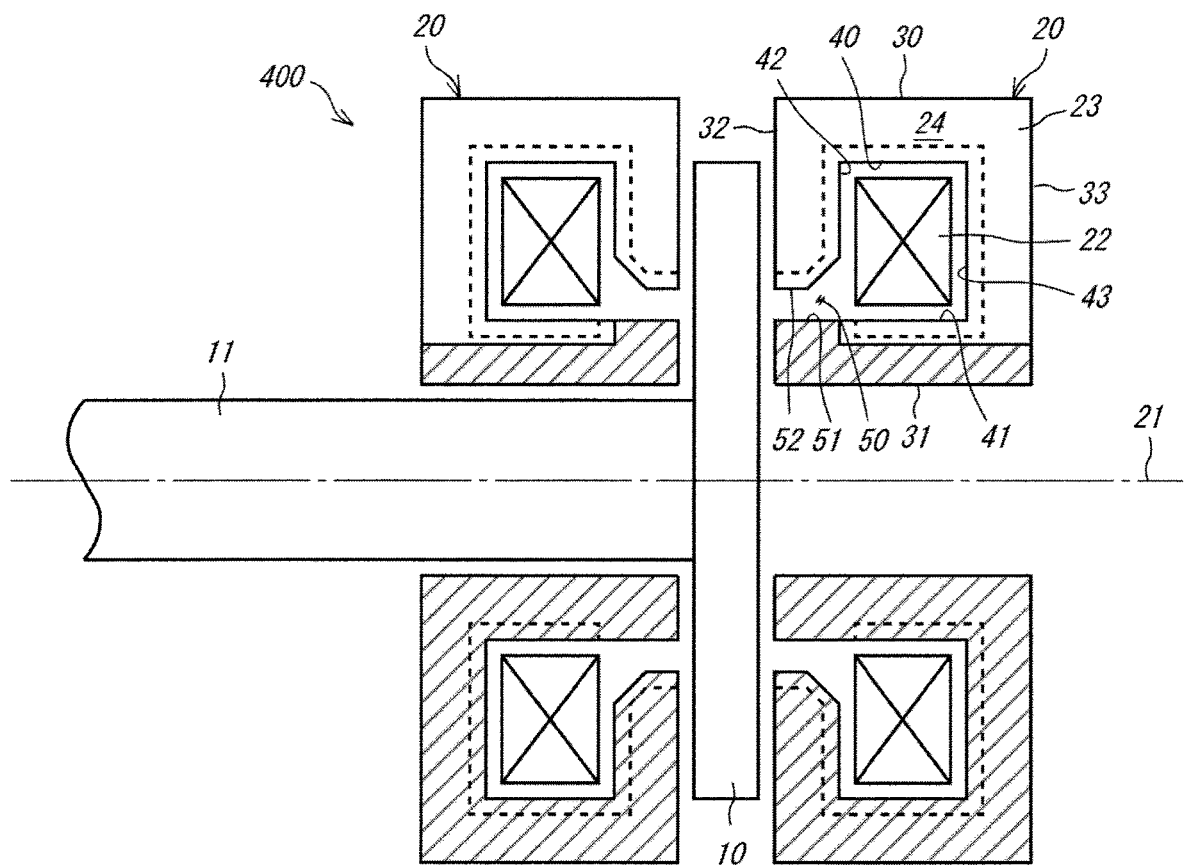
FIG. 6 is an enlarged sectional view of the thrust magnetic bearing device according to Embodiment 4.

FIG. 6 is an enlarged sectional view showing the slits 24, etc. of a thrust magnetic bearing device 400 according to Embodiment 4. Embodiment 4 is different from Embodiment 1 in that the slit 24 is formed in a range including the inside inner peripheral surface 41.

As above, in the present embodiment, since the slit 24 is formed in the range including the inside inner peripheral surface 41 around which the eddy current tends to be generated, the generation of the eddy current can be suppressed more effectively. Thus, according to the present embodiment, the deterioration of the responsiveness of the position control can be suppressed more than Embodiment 1.

Embodiment 5

Figure 7:
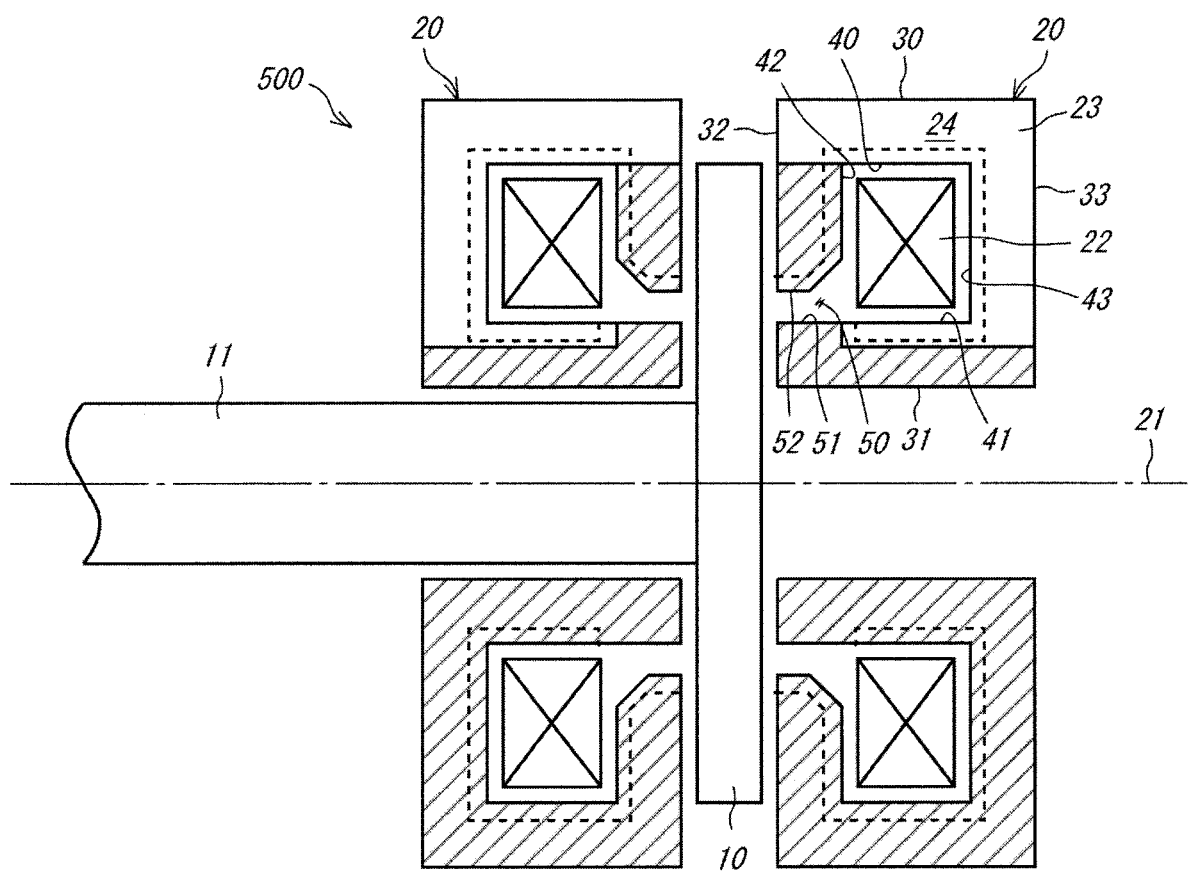
FIG. 7 is an enlarged sectional view of the thrust magnetic bearing device according to Embodiment 5.

FIG. 7 is an enlarged sectional view showing the slits 24, etc. of a thrust magnetic bearing device 500 according to Embodiment 5. Embodiment 5 is different from Embodiment 1 in that the slit 24 is not formed in a range including a portion of the outside opposing surface 32 which portion is located at a radially outer side of the inside inner peripheral surface 41 and corresponds to the thrust disc 10, a portion of the inside opposing surface 42 which portion corresponds to the thrust disc 10, and the aperture outer peripheral surface 52. Further, the present embodiment is different from Embodiment 1 in that the slit 24 is formed in a range including the inside inner peripheral surface 41.

To be specific, the thrust magnetic bearing device 500 according to the present embodiment corresponds to a combination of the thrust magnetic bearing device 200 according to Embodiment 2 and the thrust magnetic bearing device 400 according to Embodiment 4. Therefore, according to the present embodiment, the eddy current tends to be generated around the inside opposing surface 42 and the aperture outer peripheral surface 52 more than Embodiment 1. However, the decrease in attractive force of attracting the thrust disc 10 can be suppressed, and the strength of the core 23 can be increased. Further, the generation of the eddy current around the inside inner peripheral surface 41 can be suppressed.

Embodiment 6

Figure 8:
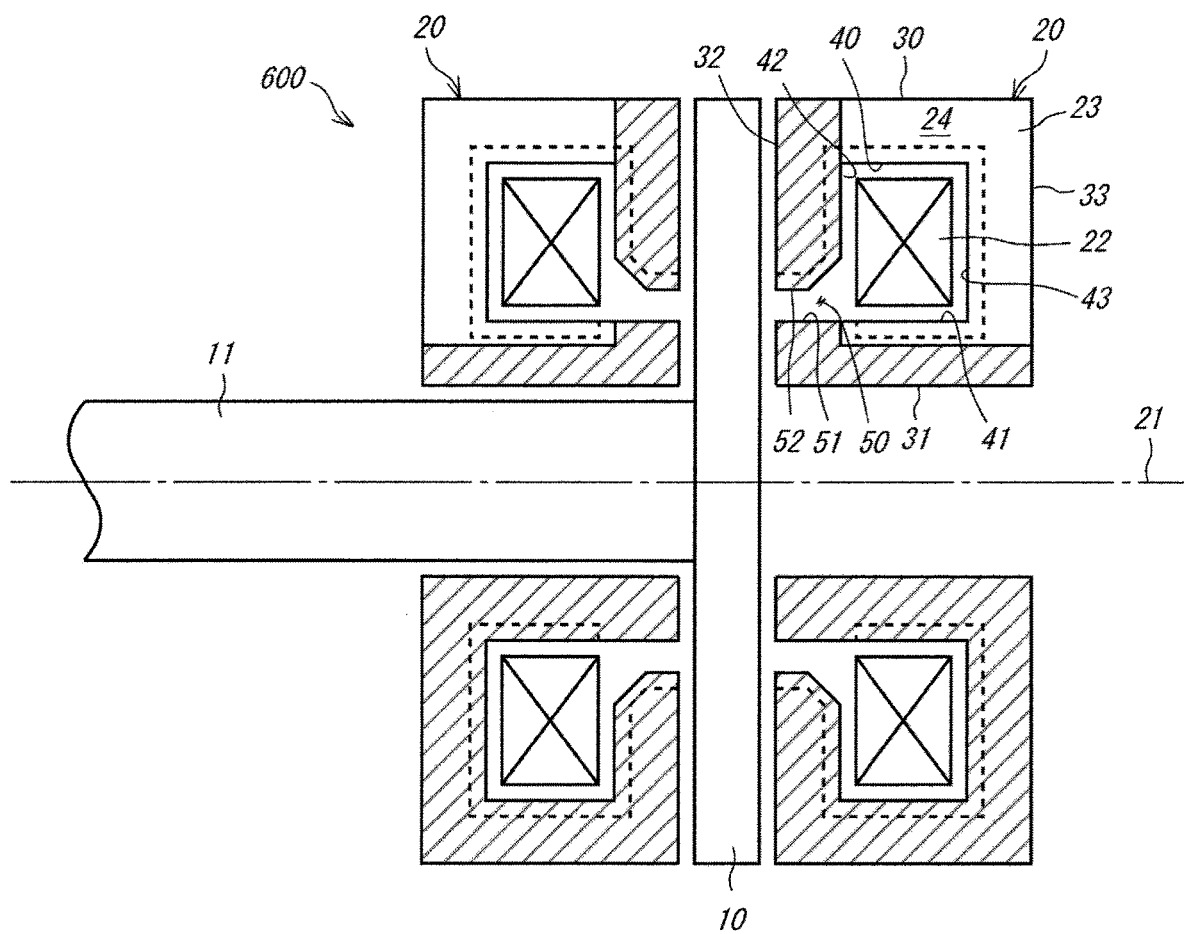
FIG. 8 is an enlarged sectional view of the thrust magnetic bearing device according to Embodiment 6.

FIG. 8 is an enlarged sectional view showing the slits 24, etc. of a thrust magnetic bearing device 600 according to Embodiment 6. Embodiment 6 is different from Embodiment 1 in that as with Embodiment 5, the slit 24 is not formed in a range including a portion of the outside opposing surface 32 which portion is located at a radially outer side of the inside inner peripheral surface 41 and corresponds to the thrust disc 10, a portion of the inside opposing surface 42 which portion corresponds to the thrust disc 10, and the aperture outer peripheral surface 52.

Further, the present embodiment is different from Embodiment 1 in that the slit 24 is formed in a range including the inside inner peripheral surface 41. However, the thrust disc 10 of the present embodiment is larger in outer diameter than the thrust disc 10 of Embodiment 5. Therefore, the above-described range where the thrust disc 10 is not formed is wider outward in the radial direction than that of Embodiment 5.

As above, the thrust magnetic bearing device 600 according to the present embodiment corresponds to a combination of the thrust magnetic bearing device 300 according to Embodiment 3 and the thrust magnetic bearing device 400 according to Embodiment 4. Therefore, according to the present embodiment, the eddy current tends to be generated around the inside opposing surface 42 and the aperture outer peripheral surface 52 more than Embodiment 1. However, the decrease in attractive force of attracting the thrust disc 10 can be suppressed, and the strength of the core 23 can be increased. Further, the generation of the eddy current around the inside inner peripheral surface 41 can be suppressed.

The foregoing has explained the embodiments. In the embodiments explained above, the slit 24 is formed at only one circumferential position. However, the slits 24 may be formed at a plurality of circumferential positions. It should be noted that the generation of the eddy current can be adequately suppressed by forming only one slit 24 at a route through which the eddy current flows. On the other hand, when a large number of slits 24 are formed, the volume of the core 23 decreases, and the electromagnetic force weakens. The attractive force of attracting the thrust disc 10 decreases, and the strength of the core 23 decreases. Therefore, by forming the slit 24 at only one circumferential position of the core 23, the generation of the eddy current can be adequately suppressed, and the decrease in attractive force of attracting the thrust disc 10 and the decrease in strength can be suppressed.

REFERENCE SIGNS LIST 10 thrust disc
11 rotating body
20 electromagnet
21 rotation axis
22 coil
23 core
24 slit
30 outside outer peripheral surface
31 outside inner peripheral surface
32 outside opposing surface
33 outside non-opposing surface
40 inside outer peripheral surface
41 inside inner peripheral surface
42 inside opposing surface
43 inside non-opposing surface
50 aperture
51 aperture inner peripheral surface
52 aperture outer peripheral surface
100, 200, 300, 400, 500, 600 thrust magnetic bearing device

The invention claimed is:

1. A thrust magnetic bearing device comprising:
a thrust disc fixed to a rotating body; and
a pair of electromagnets provided so as to sandwich the thrust disc and be spaced apart from the thrust disc in a direction along a rotation axis, each of the pair of electromagnets including:
a coil wound around the rotation axis of the rotating body; and
a ring-shaped core accommodating the coil, the core including:
an outside outer peripheral surface that is a radially outer surface;
an outside inner peripheral surface that is a radially inner surface;
an outside opposing surface opposed to the thrust disc;
an outside non-opposing surface located at an opposite side of the outside opposing surface in the direction along the rotation axis;
an inside outer peripheral surface opposed to the radially outer surface of the coil;
an inside inner peripheral surface opposed to the radially inner surface of the coil;
an inside opposing surface opposed to a surface of the coil located close to the thrust disc;
an inside non-opposing surface located at an opposite side of the inside opposing surface across the coil; and
a slit which is located at at least one circumferential position of the core and extends in a radial direction from the outside outer peripheral surface as a starting point toward a center of the core, the slit being disposed in a range including at least the inside outer peripheral surface and excluding all of the outside opposing surface directly facing the thrust disc and a portion of the inside opposing surface corresponding to the thrust disc.

2. The thrust magnetic bearing device according to claim 1, wherein the slit is disposed in a range including the inside non-opposing surface.

3. The thrust magnetic bearing device according to claim 1, wherein:
the core includes
a ring-shaped aperture extending from the inside opposing surface toward the outside opposing surface,
an aperture inner peripheral surface defining a radially inner side of the aperture, and
an aperture outer peripheral surface defining a radially outer side of the aperture; and
the slit is disposed in a range excluding the aperture inner peripheral surface.

4. The thrust magnetic bearing device according to claim 1, wherein the slit is disposed in a range including the inside inner peripheral surface.

5. The thrust magnetic bearing device according to claim 1, wherein the slit is disposed only at the one circumferential position of the core.

6. A thrust magnetic bearing device comprising:
a thrust disc fixed to a rotating body; and
a pair of electromagnets provided so as to sandwich the thrust disc and be spaced apart from the thrust disc in a direction along a rotation axis, each of the pair of electromagnets including:
a coil wound around the rotation axis of the rotating body and
a ring-shaped core accommodating the coil, the core including:
an outside outer peripheral surface that is a radially outer surface;
an outside inner peripheral surface that is a radially inner surface;
an outside opposing surface opposed to the thrust disc;
an outside non-opposing surface located at an opposite side of the outside opposing surface in the direction along the rotation axis;
an inside outer peripheral surface opposed to the radially outer surface of the coil;
an inside inner peripheral surface opposed to the radially inner surface of the coil;
an inside opposing surface opposed to a surface of the coil located close to the thrust disc;
an inside non-opposing surface located at an opposite side of the inside opposing surface across the coil; and
a slit which is located at at least one circumferential position of the core and extends in a radial direction from the outside outer peripheral surface as a starting point toward a center of the core, the slit being disposed in a range including the inside outer peripheral surface, the inside non-opposing surface, and all of the outside non-opposing surface directly facing the inside non-opposing surface.

* * * * *